Nov. 18, 1969    R. F. REINKE    3,478,819
VARIABLE HEAT CONDUCTOR

Filed July 18, 1966    2 Sheets-Sheet 1

INVENTOR.
ROBERT F. REINKE

BY *[signature]*

ATTORNEY

Nov. 18, 1969  R. F. REINKE  3,478,819
VARIABLE HEAT CONDUCTOR
Filed July 18, 1966  2 Sheets-Sheet 2

INVENTOR.
ROBERT F. REINKE
BY
ATTORNEY

United States Patent Office 3,478,819
Patented Nov. 18, 1969

3,478,819
VARIABLE HEAT CONDUCTOR
Robert F. Reinke, Crystal, Minn., assignor to Honeywell Inc., Minneapolis, Minn., a corporation of Delaware
Filed July 18, 1966, Ser. No. 566,116
Int. Cl. G05d 23/00; F28f 27/00
U.S. Cl. 165—32      3 Claims This invention relates to apparatus for controlling a condition such as the temperature of devices on space vehicles. Such space vehicles often have a mission covering an extended period of time. The devices on such vehicle may constitute one or more sensors that in themselves constitute a group. For example an attitude reference system such as an inertial platform includes a plurality of sensors. Some of these sensors may be floated rate integrating gyroscopes, well known in the art. Such gyroscopes have an operating temperature that should be controlled to a preset magnitude because certain gyroscope parameters such as drift rates, torquing scale factors and displacement scale factors are extremely temperature sensitive.

While the sensor may receive heat due to the dissipated heat resulting from energization of its motor and/or torquer to thereby raise it above the ambient temperature, it may be necessary in some case of low dissipated heat to additionally provide a temperature rise into the sensor by a separate electrically powered heater.

However, various applications of such attitude reference, as noted especially those in space vehicles having a considerable duration, accentuate the need for minimum electrical power consumption since such space vehicle usually expends or consumes electrical power and does not generate it so that its supply is limited.

An object of this invention is to provide improved control apparatus to minimize electrical power consumption on a vehicle.

A further object of this invention is to minimize the added electrical power required to provide heat to apparatus that also indirectly receives heat while being electrically energized for its operation.

A further object of this invention is to minimize the added electrical heater power required to provide heat to flight condition sensors which sensors are also supplied indirectly with heat when they are of the electrically energized type for operating purposes.

The above and further objects of the invention will more clearly appear from the following description and the appended drawings wherein.

Recent applications of attitude reference systems such as inertial reference platforms for space vehicles wherein such reference platform has a plurality of sensors that are electrically energized, have accentuated the need to reduce electrical power consumption. Assessment of electrical power consumption elements in the system such as the inertial platform reveals that sensor heater power is a prime consideration. By heater power is meant additional heat that must be supplied to the sensor to provide the desired operating temperature. This heater power is above and beyond the normal heat indirectly derived during energization of the motor or torquer of such sensor. The latter electrical power is termed sensor fixed excitation power.

The sensor operating temperature must be controlled to a constant preset value since certain sensor parameters, such as drift rates, torquing scale factors, and displacement scale factors are extremely temperature sensitive.

The sensor is normally controlled to some temperature above the maximum ambient temperature by thermally insulating the sensor from the ittitude reference support structure by fixed insulation and varying the heater power applied to the sensor with or by means of a temperature control amplifier. In addition to the fixed energization, the maximum fixed thermal resistance or insulation mentioned above which can be used is (1) a direct function of the difference between the fixed sensor operating temperature and the maximum ambient temperature, i.e., high ambient-small fixed thermal resistance, and (2) an inverse function of the fixed sensor excitation power to the spin motor and signal generator, i.e., low excitation power-high thermal resistance. Thus the fixed thermal resistance is a compromise of high ambient temperature and low excitation power or vice versa.

The heater power that is the additional heater power required above the heat due to excitation is an inverse function of this thermal resistance or insulation and a direct function of the ambient temperature range over which the attitude reference structure is required to operate.

For example, a typical sensor which operates at 180 degrees F. and has three watts fixed excitation power would require 22.5, 15.0 or 11.25 watts heater power respectively, at zero degrees F. minimum ambient temperature when designed for maximum ambient temperature of 160 degrees F., 150 degrees F. or 140 degrees F. respectively.

Below is discussed methods and apparatus by which such electrical consumption can be reduced.

Figure 1:
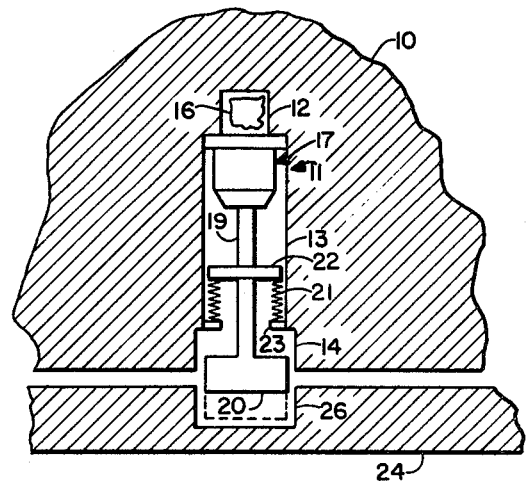
FIGURE 1 is a view of a typical thermally controlled heat regulator herein.

Returning to FIGURE 1, it is to be understood and assumed that in all cases discussed below, the sensor operating temperature is in excess of the ambient temperature. In FIGURE 1, a sensor block 10, that supports the sensor has a cylindrical chamber 11. This chamber has three coaxial portions 12, 13, 14 of different diameters. Within diameter portion 12 there is positioned a thermal responsive element 16 of a thermal actuator 17. This element 16 may be a compound which changes state at a selected temperature and during such change in state will expand.

Connected with the housing for the compound is a piston rod 19 connected also to a piston 20. A return spring 21 for the piston engages a flange 22 on the piston rod 19 and rests on an annular ledge 23 extending inwardly from the walls of the portion 13. Below sensor block 10 and spaced therefrom in insulated relationship is a package housing 24 for block 10 and serving as a heat sink. The housing 24 has an upwardly directed cup shaped portion 26 axially aligned with the piston 20.

Thus the thermal actuator 17 is a device which extends piston 20 when a specific temperature is reached, due to the compound 16 changing state. This forces the heat conductor piston 20 toward the heat sink or package housing 24 which increases the metal to metal contact area between the piston and heat sink which decreases the thermal resistance and prevents a further temperature increase of the sensor block 10.

If the sensor block temperature decreases, the thermal actuator 17 retracts allowing piston 20 to be retracted by the return spring 21 and the thermal resistance thus is increased. This device thus provides a variable thermal resistance which removes the restrictions imposed by the ambient temperature variations, the sensor operating temperature and sensor fixed excitation as outlined above. This variable thermal resistance device can be utilized as in FIGURE 2 where no heater power is applied to the sensors or as in FIGURE 3 where the device is used in conjunction with sensor heater power to minimize the power required.

Figure 2:
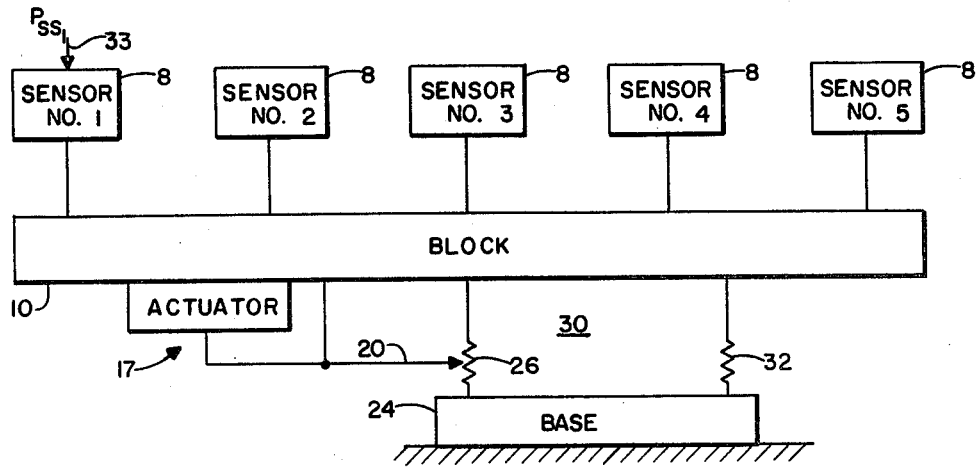
FIGURE 2 is a block diagram of a plurality of electrically energized sensors constituting a group and the passive temperature control apparatus therefor.

FIGURE 2 shows a passive temperature control arrangement which is of the heaterless type, that is no heat is applied to sensors other than that resulting from the fixed energization of the electrically driven portions thereof such as, for example, the rotor, torquer, pickoff. In FIGURE 2, a plurality of electrically energized sensors 8 are structurally supported on block 10 similar to block 10 of FIGURE 1. The block 10 is connected to a base or heat sink 24 through thermal resistance elements one of which comprises a variable heat transmitting path ($Z_V$) consisting of the relatively movable elements 20, 26 of FIGURE 1 and the other is a fixed thermal resistance path 32 ($Z_F$).

This heat conducting path 32 represents a fixed thermal resistance $Z_F$, a factor existing in packaging or constructing the sensor arrangement which cannot be avoided and which preferably has infinite thermal resistance value.

The thermal resistance paths have been represented in FIGURE 2 somewhat like electrical elements because of the analogy between the mathematics of heat transfer and electrical current transfer. All the sensors 8 and the thermal actuator are tied directly to the sensor block 10 and are essentially at the block temperature.

In FIGURE 2, none of the sensors 8 have a separate heater supply but each is supplied with a fixed excitation power and the dissipation of the heat caused thereby tends to raise all sensor temperatures. The mechanical transducer 16, of actuator 17 serves to control the variable thermal resistance ($Z_V$) to achieve temperature control of the gyro block and thus the sensors. The heat applied to the sensors due to the excitation thereof is represented in FIGURE 2 by arrows 33 and is referred to as steady state power ($P_{ss}$). For sensor No. 1, it is $P_{ss_1}$, and so on for the other sensors.

Figure 3:
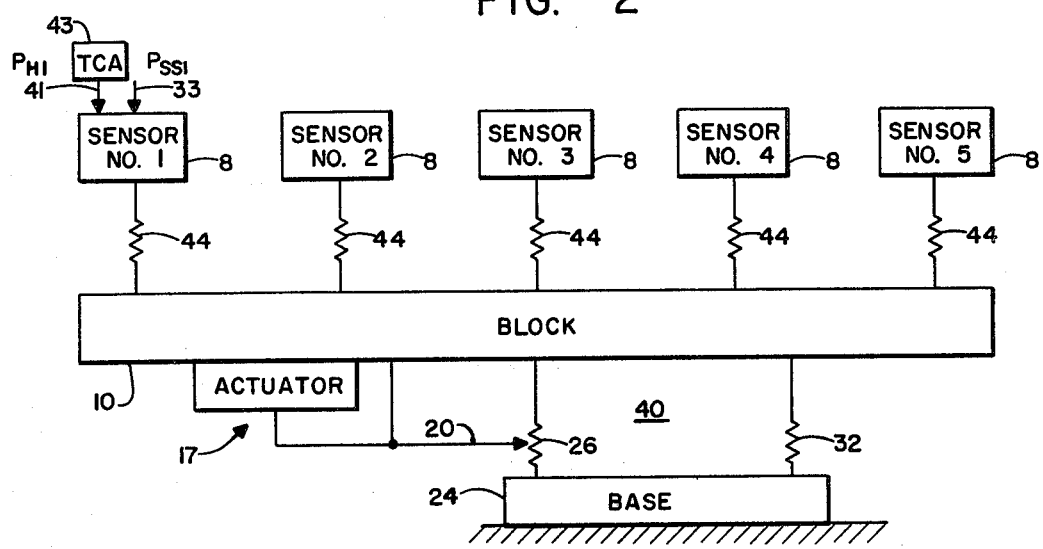
FIGURE 3 is a modification of the arrangement of FIGURE 2 wherein heater power supplements the heat due to normal energization of the sensors.

FIGURE 3 shows a modification of the arrangement in FIGURE 2. In FIGURE 3 heater power is added to the sensors 8 in addition to the heat provided by the fixed excitation of the sensors, in order to maintain precise temperature control. The application of heater power, $P_H$, is represented by the arrow head 41 in FIGURE 3. The application of this heater power may be provided by a temperature control amplifier 43.

This heater power is normally derived from electrically power and is applied to the sensor 8. Such application of heat is controlled by a temperature control amplifier. The sensor 8 contains conventionally a temperature sensitive resistance which provides the reference for the temperature control amplifier and a heater for application of power to the sensor. The temperature control amplifier is a standard, existing bridge control amplifier that applies heat power to the gyro when the temperature drops below a normal operating temperature.

A layer of insulation, represented by the thermal resistances 44, ($Z_{si}$) is also inserted between the sensors 8 and the block 10. The actuator 17 is used to regulate the block temperature in the same manner as it did in the previous arrangement of FIGURE 2. However, the sensors 8 are insulated from the block 10 in order to maintain them with heater power at a constant temperature which is above the temperature of block 10.

In other words, the actuator 17 and block 10 in this case acts as a buffer for external ambient temperature changes. This reduces the amibent temperature changes or range seen by the sensors 8 which in turn enables precise temperature control thereof with very efficient use of heater power. The passive thermal controller or actuator 17 is similar to that shown in FIGURE 1.

The relationship between the temperature of the sensors 8 in FIGURE 2 and the temperature of the base is expressed mathematically below:

$P_{ss_i}$=Steady State Power Dissipated in Each Sensor, from excitation power in terms of heat units.

Temperature of Sensor≅Temperature of Block, that is approximately equal to block temperature.

Temperature of Block=$(\sum_i P_{ss_i}) \cdot \left(\dfrac{Z_V Z_F}{Z_V + Z_F}\right) +$ Temperature of Base where $\left(\dfrac{Z_V Z_F}{Z_V + Z_F}\right)$ is a function of Temperature of Block since $Z_V$ is a function of block temperature. $Z_V$ is the variable thermal resistance, $Z_F$ is the fixed thermal resistance.

Similarly, the relationship between the temperature of the sensor and that of the base in the arrangement of FIGURE 3 is mathematically stated below:

$P_{H_i}$=Heater Power Required to Maintain Precise Temperature (Sensor $i$)

Temperature of Block ≠Temperature of Sensor, ≠ is not equal

Temperature of Sensor$_1$=Temperature of Block $+(P_{ss_i}+P_{H_i}) \cdot Z_{s_1}$ $Z_{s_1}$ being a fixed thermal impedance.

Temperature of Block $\Sigma$ $(P_{ss_i}+P_{H_i}) \cdot \left(\dfrac{Z_V Z_F}{Z_V + Z_F}\right) +$ Temperature of Base where $\left(\dfrac{Z_V Z_F}{Z_V + Z_F}\right)$ is a function of Temperature of Block since $Z_V$ is a function of block temperature.

In the above expressions, the thermal resistance between the block 10 and base 24 has been expressed somewhat in the electrical form conventional for parallel resistances.

Figure 4:
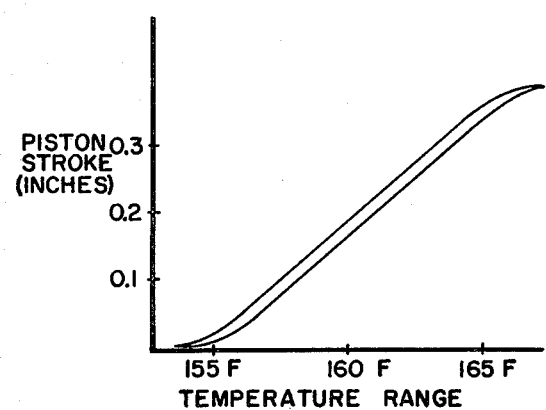
FIGURE 4 is a graph of the displacement of the temperature controller for different controller temperatures.

In FIGURE 4 the relationship between the stroke of piston 20 and the temperature range of the ambient temperature is shown. The piston displacement relative to temperature varies substantially linearly over the 155 F.–165 F. region. The hysteresis loop shown in FIGURE 4 is a function of the thermal responsive element 16 (FIGURE 1).

Figure 5:
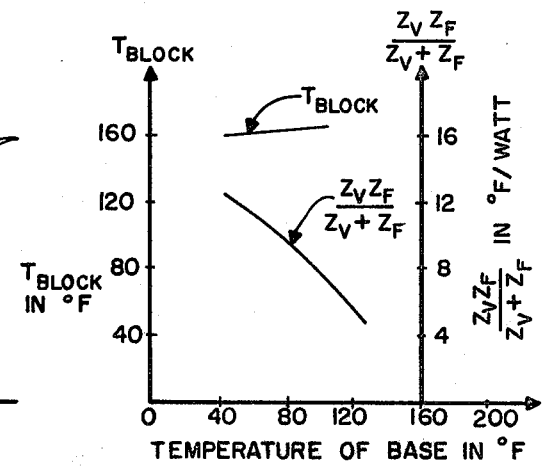
FIGURE 5 shows a graph of temperature aspects of the apparatus of FIGURE 2.

Experimental results for the arrangement of FIGURE 2 is shown in FIGURE 5. In FIGURE 5 the temperature of the base is shown as abscissae and the temperature of the block in degrees Fahrenheit is shown as ordinates in the left hand scale. Thus while the base of the reference package was subjected to ambient temperatures varying from 40 degrees to 100 degrees F., (80 degrees F.) the temperature of the block to which the sensors are mounted varied approximately 8 degrees F.

The right hand ordinate shows the scale for the thermal resistance $\left(\dfrac{Z_V Z_F}{Z_V + Z_F}\right)$ in degrees F. per watt power applied to the block 10.

The data was obtained using an actuator and variable thermal resistance which developed full travel over about 15 degrees F. range. However, actuators may be provided with full travel over a 5 degree F. range, and such a unit would provide even better control characteristics.

Test results for the arrangement of FIGURE 3 would show that the temperature of the sensors such as gyros would be maintained at a higher temperature than the temperature of the block and with this type of ambient temperature range the sensor heater power can be substantially reduced, roughly by a factor of 5, that is 80 percent savings in heater power. The above data clearly shows that the passive temperature control element comprising thermal actuator 17 would be with advantage applied to space craft applications of attitude reference systems.

Although the present invention has been described in conjunction with a type of heaterless (FIGURE 2) and heater (FIGURE 3) preferred temperature control embodiments, modifications or variations thereof are considered to be within the purview and scope of the invention and the appended claims.

What is claimed is:

1. In temperature control apparatus for a device for transmitting excessive heat in said device to a heat transmitting excessive heat in said device to a heat sink for cooling puropses, means provided a continuous but variable, heat conducting path between the device and said heat sink, comprising: an operable thermal responsive member responsive to the temperature of said device; a heat transmitting member between the device and heat sink and having a variable area of contact with said heat sink; and operating means between the thermal responsive member and the heat transmitting member to increase the area of contact thereof for higher temperatures of said device, said device comprising a plurality of condition sensors, a special heater arrangement connected to the sensors for varying the temperatures of the sensors, a block, and a thermal resistance between said block and sensors, with the variable heat conducting path being arranged between the block and the heat sink and controlled by the operating means.

2. The apparatus of claim 1, wherein said condition sensors are of the electrical energized type such energization resulting in the development of heat that alters the temperature of the sensors.

3. The apparatus of claim 1, wherein the condition sensors are gyroscopes with operating temperatures that must be controlled to a constant preset valve to avoid changes in performance such as drift rates or torquing scale factors.

References Cited

UNITED STATES PATENTS

| | | | |
|---|---|---|---|
| 3,112,878 | 12/1963 | Snelling | 165—32 XR |
| 3,177,933 | 4/1965 | Webb-Bozajian | 165—96 |
| 3,220,647 | 11/1965 | Riordan et al. | 236—1 |
| 3,225,820 | 12/1965 | Riordan | 165—32 XR |
| 3,229,755 | 1/1966 | Komarow | 165—32 |
| 3,302,703 | 2/1967 | Kelly | 165—32 XR |

FRED C. MATTERN, JR., Primary Examiner

M. ANTONAKAS, Assistant Examiner